United States Patent [19]
Meletio

[11] Patent Number: 6,062,483
[45] Date of Patent: *May 16, 2000

[54] ELECTRONIC THERMOSTAT

[76] Inventor: Larry B. Meletio, 2970 Blystone Ste 104, Dallas, Tex. 75220

[ * ] Notice: This patent issued on a continued prosecution application filed under 37 CFR 1.53(d), and is subject to the twenty year patent term provisions of 35 U.S.C. 154(a)(2).

[21] Appl. No.: 08/237,834
[22] Filed: Aug. 3, 1995
[51] Int. Cl.7 .................................................. G05D 23/00
[52] U.S. Cl. .................................. 236/78 R; 237/12.3 B
[58] Field of Search ................................. 236/78 R, 10, 236/11, 78 A, 78 B, 72, 74 R; 62/229, 180, 181, 183, 184, 186; 237/8 A, 12.3 B

[56] References Cited

U.S. PATENT DOCUMENTS

| | | | |
|---|---|---|---|
| 3,038,106 | 6/1962 | Cutsogeorge et al. | 236/78 R X |
| 3,456,455 | 7/1969 | Sapir | 236/78 X |
| 3,684,171 | 8/1972 | Evalds et al. | 236/78 R |
| 3,735,602 | 5/1973 | Ramsey | 62/184 |
| 4,210,823 | 7/1980 | Kabat et al. | 236/78 R X |
| 4,314,666 | 2/1982 | Schotten | 236/78 R |
| 4,482,092 | 11/1984 | Biber et al. | 237/12.3 B |
| 4,638,850 | 1/1987 | Newell, III et al. | 236/78 R X |
| 4,641,778 | 2/1987 | Dobson | 236/78 R X |
| 5,102,042 | 4/1992 | Hart | 236/78 R X |

FOREIGN PATENT DOCUMENTS

| | | | |
|---|---|---|---|
| 2465957 | 4/1981 | France | 236/78 R |
| 1-261714 | 10/1989 | Japan | 236/78 R |

*Primary Examiner*—Harry B. Tanner

[57] ABSTRACT

An electronic thermostat for a temperature control in a vehicle uses a connection to a pre-existing, variable current source representing a temperature the desired ambient temperature. A temperature control unit has a temperature sensor to sense the ambient temperature, the output of which is representative of the ambient temperature, and compares that output to the pre-existing, variable current source. A control signal output from the temperature control unit regulates the ambient temperature.

3 Claims, 2 Drawing Sheets

Component List

| | 25 | | 25 |
| --- | --- | --- | --- |
| | THR-124 | | THR-112 |
| | 24 V | | 12 V |

| | | | |
| --- | --- | --- | --- |
| 50 | D1- 6.2 Zenor Diode | | D1 - 5.1 Zenor Diode |
| 49 | TH1- Thermistor 10K | | TH1 - Thermistor 10K |
| 34 | R1- 5.1K | | R1- 2.2K |
| 35 | R2- 43K | | R2- 22K |
| 37 | R3- 10K | | R3- 10K |
| 36 | R4- 750K | | R4- 750K |
| 40 | R5- 36K | | R5- 36K |
| 39 | R6- 50K (10 Turn Pot) | | R6- 50K (10 Turn Pot) |
| 41 | R7- 36K | | R7- 36K |
| 42 | R8- 150K | | R8- 150K |
| 43 | R9- .1 UF Disc Cap. (Resistive Value Only) | | R9- 10 Meg. |
| 44 | R10- 150K | | R10- 150K |
| 45 | R11- 150K | | R11- 150K |
| 46 | R12- 15K | | R12- 13K |
| 38 | R13- 510K | | R13- 510K |
| 48 | R14- 10K | | R14- 10K |
| 55 | Q1- 2N2907 | | Q1- 2N2907 |
| 56 | Q2- TIP120 | | Q2- TIP120 |
| 47 | IC1- 741 | | IC1- 74101 CMOS |
| 51 | C1- .1 UF Disc Cap. | | C1- .1 UF Disc Cap. |

Figure 1A

ELECTRONIC THERMOSTAT

FIELD OF THE INVENTION

This invention relates generally to the field of electronics and more particularly to an electronic thermostat controller for heat and air conditioning in a bus.

BACKGROUND OF THE INVENTION

As currently used in busses and the like, there is a mercury thermostat having a glass thermometer and metal collars burned into the glass to cause switching as the mercury moves through the metal collars. Also, it uses a coil wrapped around the thermometer to create heat to cause the mercury to connect the collars.

SUMMARY OF THE INVENTION

This electronic thermostat was designed to replace a mercury thermostat that is presently being used on buses for climate control. This new electronic thermostat uses the same wiring plug, and the same tube dimensions as the mercury thermostat for a complete retrofit. The temperature controller energizes a relay and modulates the temperature.

The electronic thermostat uses a Darlington transistor to switch the output, and a voltage dividing circuit to raise and lower the temperature settings with a special hysterisis circuit to help in the regulation of the on/off times. A unique power design allows the thermostat to work with the same three wires provided by the original thermostat. Therefore, the process of changing from the mercury/glass thermostat to the electronic thermostat is using the same space, switching the same contacts to operate air conditioning, using the same three wires, and plug to retrofit. Another thing that is the same, is the ability to control the temperature from the cab area of the vehicle by the driver from the original OEM controls making a complete retrofit.

It is, therefore the principle object of the present invention to provide a temperature controller for precise climate control in a vehicle.

Another object of the invention is to provide temperature control by modulating a relay that controls an air conditioning and heating system in the bus, in response to an on-board sensor on the PC board.

Another object of the invention is to retrofit to the existing 3-wire system without having to add an additional wire to power the unit.

It is also the object of the invention to provide a unit that is more efficient and responds more quickly than that of the existing thermostat.

It is yet another object of the present invention to be used as a retrofit unit, with no moving parts which makes the life of this thermostat greater than its predecessor.

A related object of this invention is to be able to rebuild this thermostat economically. An ancillary object of this thermostat is to have variable voltage rate: 12 and 24 volts to accommodate to the existing power available on a bus.

An object of this invention is to be able to precisely control the climate temperature in a bus using a special hysterisis circuit to help in regulation of the temperature. With this special circuit, the existing OEM control in the cab area for the driver is able to be used without any changes, therefore making it a perfect retrofit.

Another object of this invention was to give a wider range of control to the driver from its predecessor.

Other objects and advantages of the invention will be apparent upon considering the attached detailed description in reference to the drawings included therein.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 1A is a listing of components of FIG. 1 for each 12 volt and 24 volt device.

DETAILED DESCRIPTION OF PREFERRED EMBODIMENT

While the invention is described in connection with preferred embodiments, it will be understood that I do not intend to be limited to the particular embodiments shown but intend, on the contrary, to cover the various alternative and equivalent constructions included within the spirit and scope of the appended claims.

The main controls for the vehicle air conditioning and heating system are housed in the vehicle. The air conditioning and heating system controls include an air conditioning junction box and a thermostat mount where the electronic thermostat is housed along with the three wire harness connecting to the junction box. The driver controls are connected to the junction box through the body of the bus with a harness.

Figure 1:
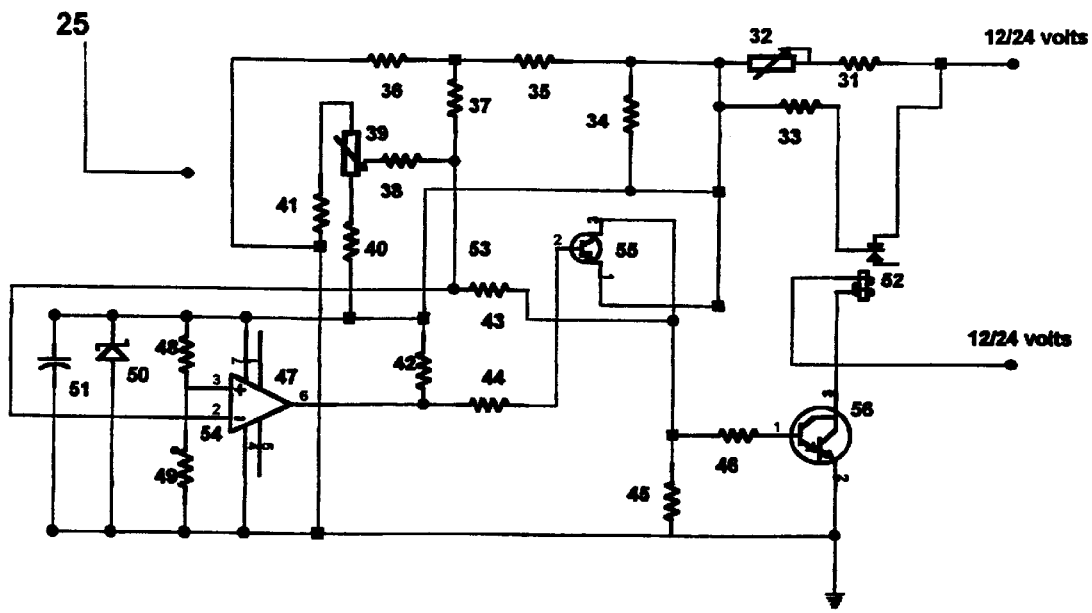
FIG. 1 is a detailed component layout of the electronic thermostat schematic in accordance with a preferred embodiment of the invention.

Referring now to FIG. 1, the controller is commercially referred to as THR-124 for the 24-volt version and THR-112 for the 12-volt version and will be so referred to here. Electronic thermostat 25 is designed with a parasitic circuit derived from a feed voltage into a 920 ohm resistor 31 through a 5 K pot 32 and into a network of voltage dividers consisting of a 5.1 K resistor 34 and a 10 K resistor 37 and the resistive value of a 0.1 UF capacitor 43. This combination of voltage dividers creates a voltage-bias network. This network consists of a 35 K resistor 40 a 50 K pot 39, and a 36 K resistor 41 which creates a hysterisis node 53. By increasing, or decreasing the voltage node at 0.1 UF 43 and node 53 at 1C741, PIN 3 47, the input 54 to the comparator 741 47 you can shift the comparator high or low, and turn on the control circuit 55 consisting of Q1 55 and Q2 56. Control of the temperature is from the 5 K pot 32 which shifts the voltage node 53 to turn the comparator high or low, with respect to the sensor TH1 49. Comparing both voltages at the comparator 47 with respect to a 10 K resistor 48 and sensor TH1 49 this causes a low at the output of the IC741 47 turning on Q1 55 and Q2 56 therefore causing the relay 52 to engage. Q2 56 is a Darlington device, and is used for its high gain and rapid on/off time.

Capacitor 0.1 UF 43 is at the summing node for hysterisis and is used to sense any voltage shift from the 5 K pot 32 or the input sensor TH1 49. Due to the high impedance node, 53 we use a 10 meg resistor for the THR-112 or 12-volt operation, and a 0.1 UF 43 ceramic disk cap for the THR-124 for its resistive value only. This circuit works with the preexisting variable voltage source via R5.1 K 34 R43 K 35 and R10 K 37 and has no separate power of its own. It draws its power from a voltage shunt circuit that already has 24 volts riding through it. R920, 31 R5 K pot, 32 and R2.7 K 33. This original voltage was used to heat a coil on the glass thermostat tube to force the mercury up to its contacts. By using this existing 3 wire system, the new THR-124 and 112, makes a perfect retrofit. Referring again to FIG. 3, the voltage regulation for the THR-124 and 112 are on-board using a 6.2 v Zenor diode for 24 volt, and a 5.1 v Zenor for 12 volt. The THR-112 has resistor changed to a 2.2 k resistor 35. Changes to a 22 K resistor and 46 bias resistor to 13 K and 43 summing node, to 10 meg resistor. These changes only have to be made for the 12 volt variety.

Turning now to FIG. 1A, there is shown the values of each component of circuit depicted in FIG. 1 for each of the 12 volt and 24 volt embodiments of the present invention.

Figure 2:
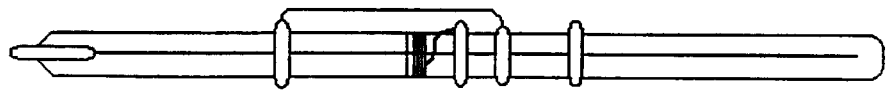
FIG. 2 shows a thermostat according to the prior art.

Turning now to FIG. 2, there is shown the prior glass, mercury filled thermostat.

As will be recognized by those skilled in the art, the innovative concepts described in the present application can be modified and varied over a tremendous range of applications, and accordingly the scope of patented subject matter is not limited by any of the specific exemplary teachings given.

While the invention has been described in connection with preferred embodiments, it will be understood that we do not intend to be limited to the particular embodiments shown but intend, on the contrary, to cover the various alternative and equivalent constructions included within the spirit and scope of the appended claims.

I claim:

1. An electronic thermostat for temperature control in a vehicle comprising:

a connection to a pre-existing, variable current source representing the desired ambient temperature, said pre-existing, variable current source providing the power to operate the electronic thermostat;

a temperature control unit having a temperature sensor to sense the ambient temperature, the output of which is representative of the ambient temperature, and compare that output to the pre-existing, variable current source; and a control signal output from the temperature control unit to regulate the ambient temperature.

2. The electronic thermostat as claimed in claim 1 further comprising a Darlington transistor switch output.

3. The electronic thermostat as claimed in claim 1 further comprising a hysterisis circuit to regulate the circuit from on to off or from off to on.

* * * * *